US007942660B2

(12) United States Patent
Bambi et al.

(10) Patent No.: US 7,942,660 B2
(45) Date of Patent: May 17, 2011

(54) DEVICE FOR MOUNTING A MOULD IN A MACHINE THAT MAKES SANITARYWARE

(75) Inventors: Domenico Bambi, Budrio (IT); Ivano Medri, Lugo (IT)

(73) Assignee: Sacmi Cooperativa Meccanici Imola Societa' Cooperativa, Imola (IT)

( * ) Notice: Subject to any disclaimer, the term of this patent is extended or adjusted under 35 U.S.C. 154(b) by 208 days.

(21) Appl. No.: 12/270,550

(22) Filed: Nov. 13, 2008

(65) Prior Publication Data

US 2009/0136612 A1 May 28, 2009

(30) Foreign Application Priority Data

Nov. 26, 2007 (IT) .................................. BO07A0783

(51) Int. Cl.
*B29B 7/08* (2006.01)

(52) U.S. Cl. ........ 425/182; 425/185; 425/186; 425/195; 425/408; 425/405.1

(58) Field of Classification Search .................... 425/73, 425/84–86, 215, 405.1, 450.1, 459.1, DIG. 122, 425/182–195, 408; 249/141, 160
See application file for complete search history.

(56) References Cited

U.S. PATENT DOCUMENTS

| | | | | |
|---|---|---|---|---|
| 4,425,091 | A * | 1/1984 | Prince | 425/450.1 |
| 4,773,839 | A * | 9/1988 | Case et al. | 425/186 |
| 5,662,944 | A * | 9/1997 | Petrucco | 425/84 |
| 5,922,258 | A * | 7/1999 | Bossetti | 425/84 |
| 7,165,960 | B2 * | 1/2007 | Bambi et al. | 425/183 |

FOREIGN PATENT DOCUMENTS

| | | | |
|---|---|---|---|
| EP | 1 403 022 | B1 | 11/2006 |
| EP | 1775089 | A1 | 4/2007 |
| WO | 2005110705 | A1 | 11/2005 |

* cited by examiner

*Primary Examiner* — Richard Crispino
*Assistant Examiner* — Thu Khanh T Nguyen
(74) *Attorney, Agent, or Firm* — Pearne & Gordon LLP

(57) ABSTRACT

A device for mounting a mould in a machine (1) that comprises: a mould (2) composed of two half-moulds (2*a*, 2*b*), each of which comprises an active filtering portion (2*ar*, 2*br*) and a rigid structural portion (5, 6); a mounting platen (3, 4) for each half-mould (2*a*, 2*b*), movable towards and away from each other; the service plate (5) of the first half-mould (2*a*) is rigidly connected, in use, between the active portion (2*ar*) and the respective platen (3); the device comprises reference and quick connect means (7, 8) located in a region above the center of gravity of the first half-mould (2*a*), and acting between the platen (3) and the service plate (5) in order to fasten the first half-mould (2*a*) in a predetermined, hanging position correlated between the platen (3) and the plate (5).

22 Claims, 10 Drawing Sheets

DEVICE FOR MOUNTING A MOULD IN A MACHINE THAT MAKES SANITARYWARE

BACKGROUND OF THE INVENTION

This invention relates to a device for mounting a mould in a machine that makes sanitaryware.

In particular, but not exclusively, the device according to the invention may be used in machines that make sanitaryware by casting slip under pressure in porous moulds.

One of the most well-known types of machine, considered in this specification purely by way of example without limiting the scope of the solution provided by the invention, is a single mould type machine which basically comprises a mould divided into two half-moulds ("male" and "female") which are joined to form an internal cavity where the article of sanitaryware is formed. Each of the half-moulds is mounted on a vertical support or platen.

The two platens face each other and can move relative to each other along a bed or on overhead rails along a substantially horizontal line, or clamping line. When the two platens are close together, the half-moulds are joined so that the slip can be cast under pressure in the mould cavity to make an article of sanitaryware such as (for example) a shower tray, washbasin, flush tank, washbasin pedestal, and so on.

Usually, each half-mould also comprises a service plate that can be placed between the platen and an active porous resin filtering portion of the half-mould.

This plate covers or protects service circuits such as the half-mould drainage system.

With its regular, rigid surface, the service plate also acts as mechanical positioning element between the active porous resin filtering portion of the mould (made of porous resin and hence elastic) and the surface of the platen. Acting between the service plate and the platen there are clamping means which securely fasten each half-mould to the respective platen.

Another part that might be found on the mould is the containment unit, that is, a device for opposing the forces generated transversally (i.e. radial forces) relative to the clamping line during pressure casting.

At present, one of the major drawbacks of machines of this kind (but also of multi-mould machines) is the excessive down time necessary for changing the mould, which obviously reflects negatively on the productivity of the machine.

As a general rule, the changeover procedure involves removing the mould, which also means disconnecting all the service circuits for the mould (water drainage, air, vacuum and pressure release to the atmosphere) and for making the sanitaryware (feed and discharge of slip and drainage air) and then mounting another mould and connecting up all the service circuits again.

For mounting the service plate to the platen, two or more clamps are used. The clamps are positioned against the service plate and then fastened to the platen.

This procedure, as may be well imagined, is extremely long and laborious not only because of the size and weight of the mould but also on account of the multiplicity of parts to be handled (such as the service circuits).

To reduce machine down time, the same Applicant as this invention has designed and constructed a machine (see patent EP 1.403.022) where one of the two platens can be tilted about its axis, substantially horizontal and perpendicular to the clamping line, to facilitate access to and substitution of the mould.

Using a forklift truck or crane, the whole mould is placed on the platen positioned horizontally and the abutting service plate is secured using the clamps. Next, the platen is tilted back to the vertical position to enable the two platens to be moved closer together so that the service plate can be fastened to the platen that is still free. The service circuits can then be connected up and the machine made ready to operate.

This tilting platen solution has undoubtedly improved mould accessibility, making the mould changing procedure easier and reducing machine down time. It is not, however, always available in single-mould machines and, above all, it is a solution that cannot be "transferred" to multi-mould machines.

In addition to that, it should be remembered that mould positioning in all machines, including those with tilting platen, is performed without a constant plate-platen reference (adaptation to assist fastening is done with the aid of the clamps) and adapting also the service connections: once again, that means excessively long mould changeover times.

SUMMARY OF THE INVENTION

The aim of this invention, therefore, is to overcome the above disadvantages by providing a mould mounting device, in particular for a machine used to make sanitaryware, having a simple structure and technical characteristics adapted to suit the structure of the platen and mould components such that the mould is always positioned with fixed references, adaptable to many different casting machine designs, so as to significantly reduce machine down time.

In accordance with the invention, the above aim is achieved by a mould mounting device, in particular a device for mounting a mould in a machine that makes sanitaryware, comprising the technical characteristics set out in one or more of the appended claims.

BRIEF DESCRIPTION OF THE DRAWINGS

The technical characteristics of the invention, with reference to the above aims, are clearly described in the appended claims and its advantages are apparent from the detailed description which follows, with reference to the accompanying drawings which illustrate a preferred embodiment of the invention provided merely by way of example without restricting the scope of the inventive concept, and in which:

DESCRIPTION OF THE PREFERRED EMBODIMENTS

Figure 1:
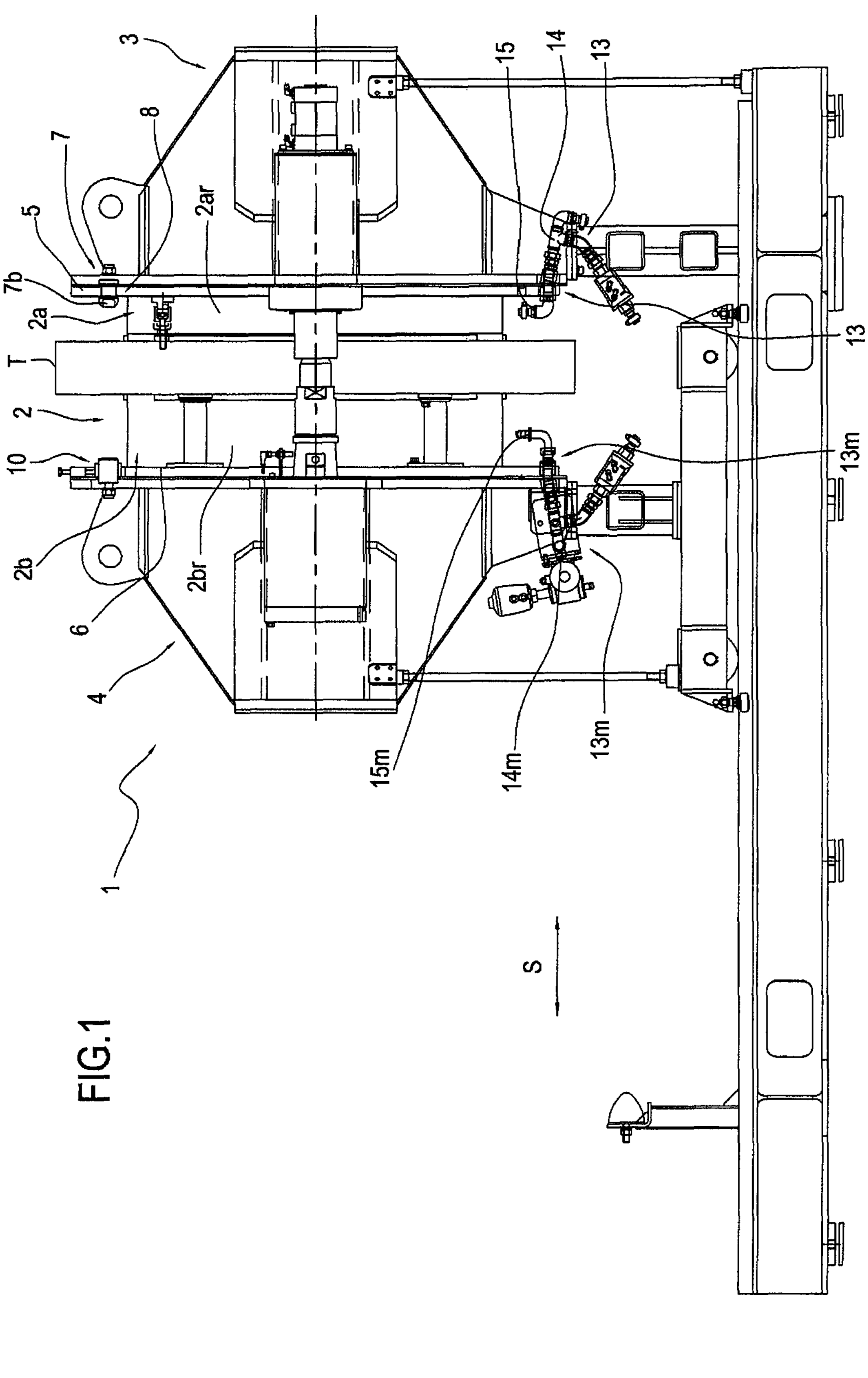
FIG. 1 is a side view of a mould mounting device according to the invention, applied to a machine for making ceramic sanitaryware.

With reference to the accompanying drawings, in particular FIGS. 1 to 4, the mould mounting device according to the invention can be used on a machine 1 that makes articles of ceramic sanitaryware by casting slip under pressure in porous moulds.

Although reference is hereinafter made purely by way of example to a single-mould machine, it shall be understood that the device can also be used in multi-mould machines without thereby limiting the scope of the inventive concept.

The machine 1 essentially comprises at least:

- a mould 2 composed of at least two half-moulds **2*a* and 2*b* that can be joined to each other to form an internal cavity where the article of sanitaryware is formed; each of the half-moulds 2*a* and 2*b* comprising an active filtering portion 2*ar*, 2*br* made of porous resin and a passive rigid structural portion 5 and 6, shaped like a plate and integral with the active portion 2*ar*, 2*br;***
- a mounting unit or platen 3, 4 for each half-mould **2*a*, 2*b*, placed opposite each other and movable towards and away from each other along a clamping line S (indicated by the arrow in FIGS. 1 and 2**);
- each service plate 5, 6 of each half-mould **2*a*, 2*b* is rigidly connected, in use, between the active portion 2*ar*, 2*br* and the respective platen 3, 4**.

There are also reference and quick-connect means 7, 8 located in a region above the center of gravity of the first half-mould **2*a*, and acting at least between the platen 3 and the service plate 5 of the half-mould 2*a* in order to keep the first half-mould 2*a* in a predetermined, hanging position correlated between the platen 3 and the plate 5**.

To hold it securely in this position, there are first clamping means 9 positioned and acting between the platen 3 and the plate 5.

More specifically, the reference and quick-connect means 7, 8 are located in the region above the plate 5 and the platen 3 relative to the center of gravity of the first half-mould **2*a*, in order to enable the first half-mould 2*a* and the plate 5 to move by gravity into contact with the platen 3**, thereby stabilizing the position adopted.

Figure 2:
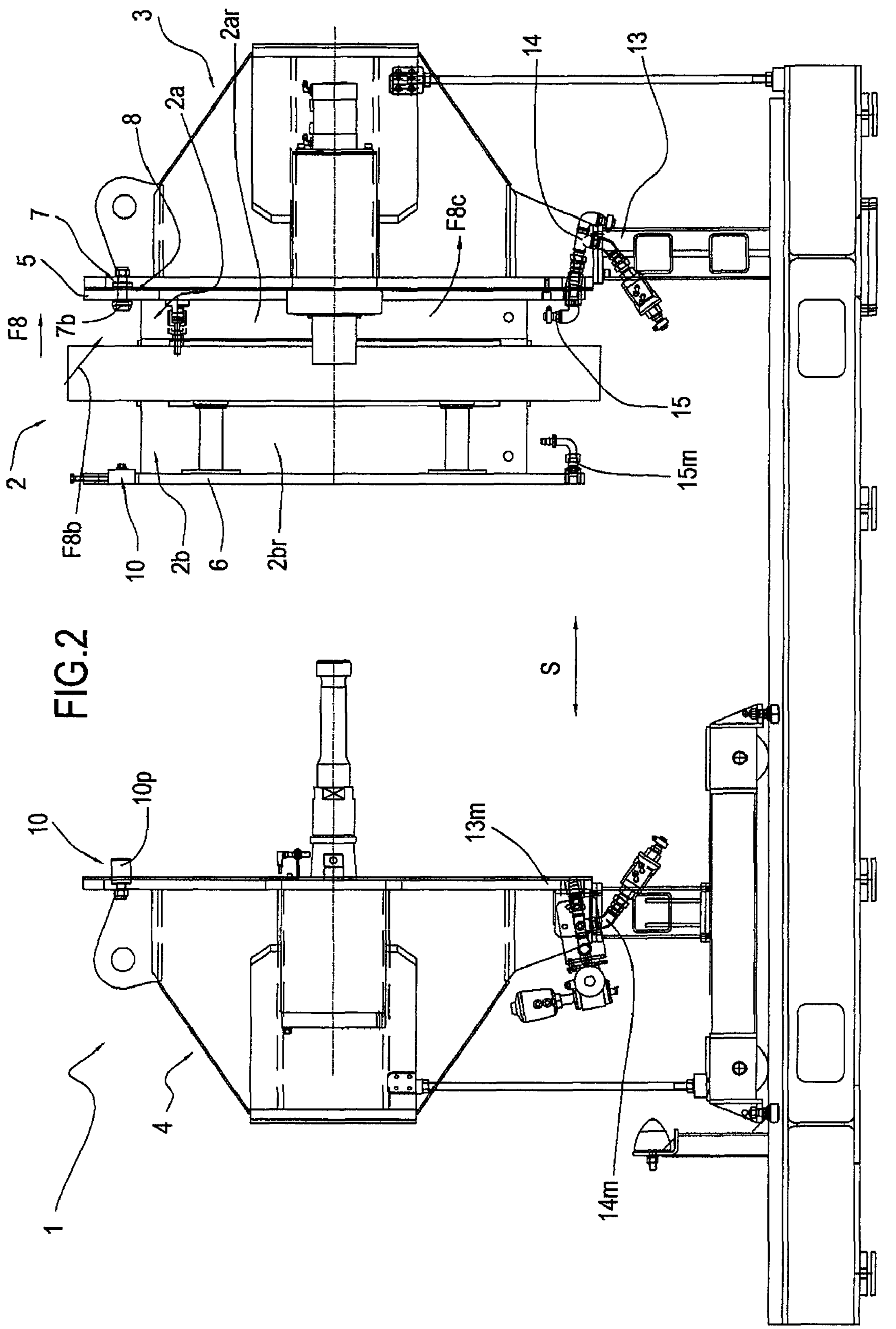
FIG. 2 illustrates the device and machine of FIG. 1 in a different operating configuration and again in a side view.

As may be observed in FIG. 2, the platen 3, which is provided with part of the reference and quick-connect means 7, 8 is the one that is fixed relative to the other platen 4 which is, instead, movable along the line S.

Further, as shown again in FIG. 2, the quick connection of the first half-mould **2*a* to the platen 3 (provided with the reference and quick-connect means 7, 8) is made after the other half-mould 2*b* has been coupled to the first half-mould 2*a***.

Obviously, other components that may be present on the mould 2 have not been mentioned since they do not fall within the scope of the invention. These include, for example, a mounting frame T and disconnectable means for stably associating the two half-moulds **2*a* and 2*b***.

Looking more closely at the technical details (with reference to FIGS. 3, 5 and 6) the quick-connect means comprise: a pair of studs 7 and a pair of slots 8.

The two studs 7 are located on the platen 3, protruding from the surface of the platen 3, and each has a stem **7*a* and a large free end 7*b***.

The two slots 8 are made in the first plate 5 and each has the shape of a two-lobed drop where the bottom lobe **8*a* has an opening larger than the diameter D of the large end 7*b* of the stud 7, allowing the latter to pass through it freely, and where the upper lobe 8*b* has an opening that is smaller than the diameter D of the large end 7*b***.

Further, the upper lobe **8*b* of each slot 8 has a semicircular upper profile that is substantially the same as the semicircular upper surface of the stem 7*a*: thus, the first plate 5** is supported stably in the predetermined position.

Figure 6:
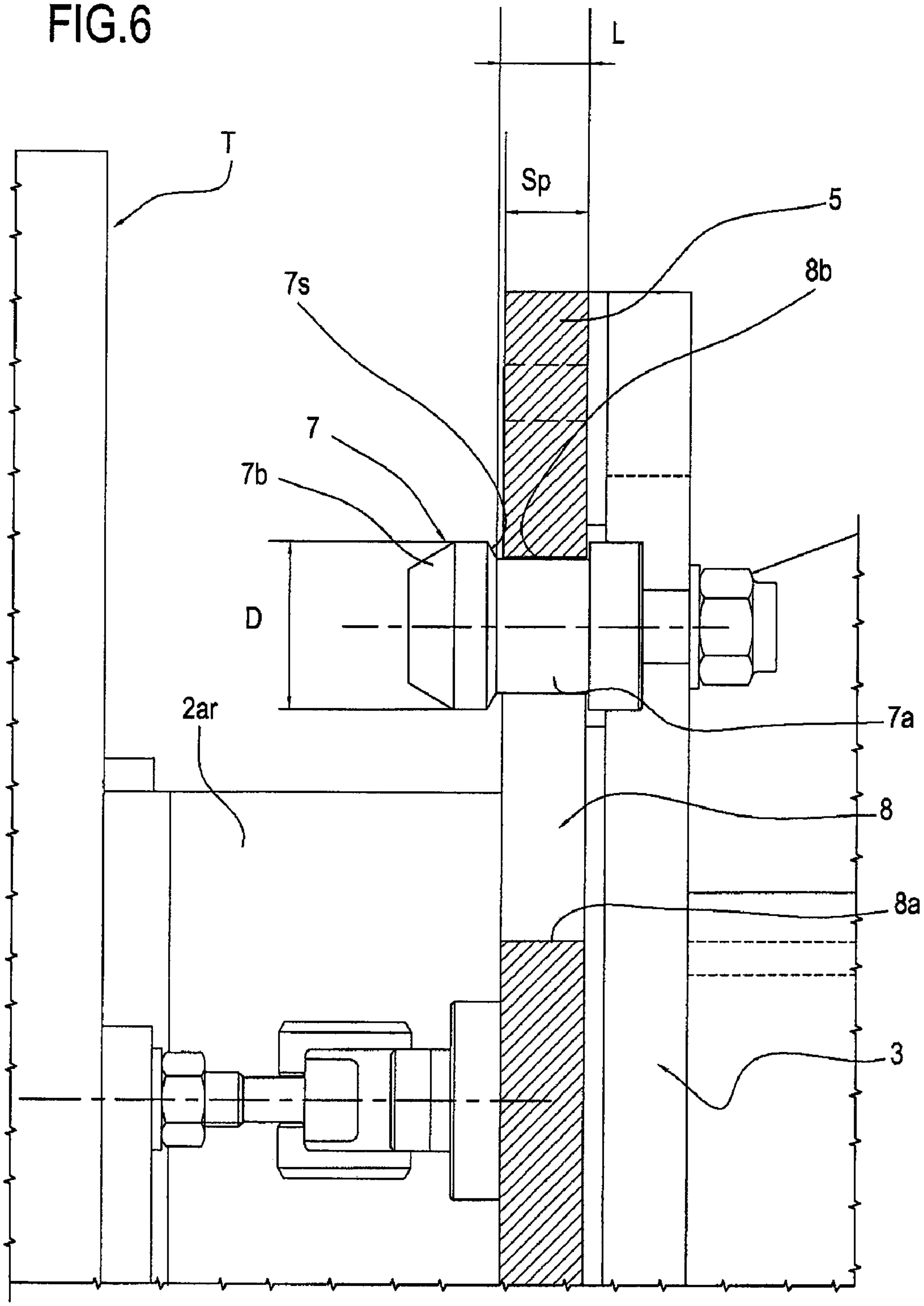
FIG. 6 is a scaled-up detail from FIG. 1, in a partial side view and showing the quick-connect means of FIG. 5.

FIG. 6 shows how the length L of the stem **7*a* of each stud 7 may be at least equal to the thickness Sp of the first plate 5, although it might be preferable for the length L to be slightly greater than the thickness Sp of the first plate 5**.

As illustrated, again in FIG. 6, the large end **7*b* of each stud 7, forming an undercut, has an inclined transition surface 7*s* to the stem 7*a*, forming a slideway along which the first plate 5 is made to slide towards the stem 7*a* until resting stably on the upper lobe 8*b***.

Figure 3:
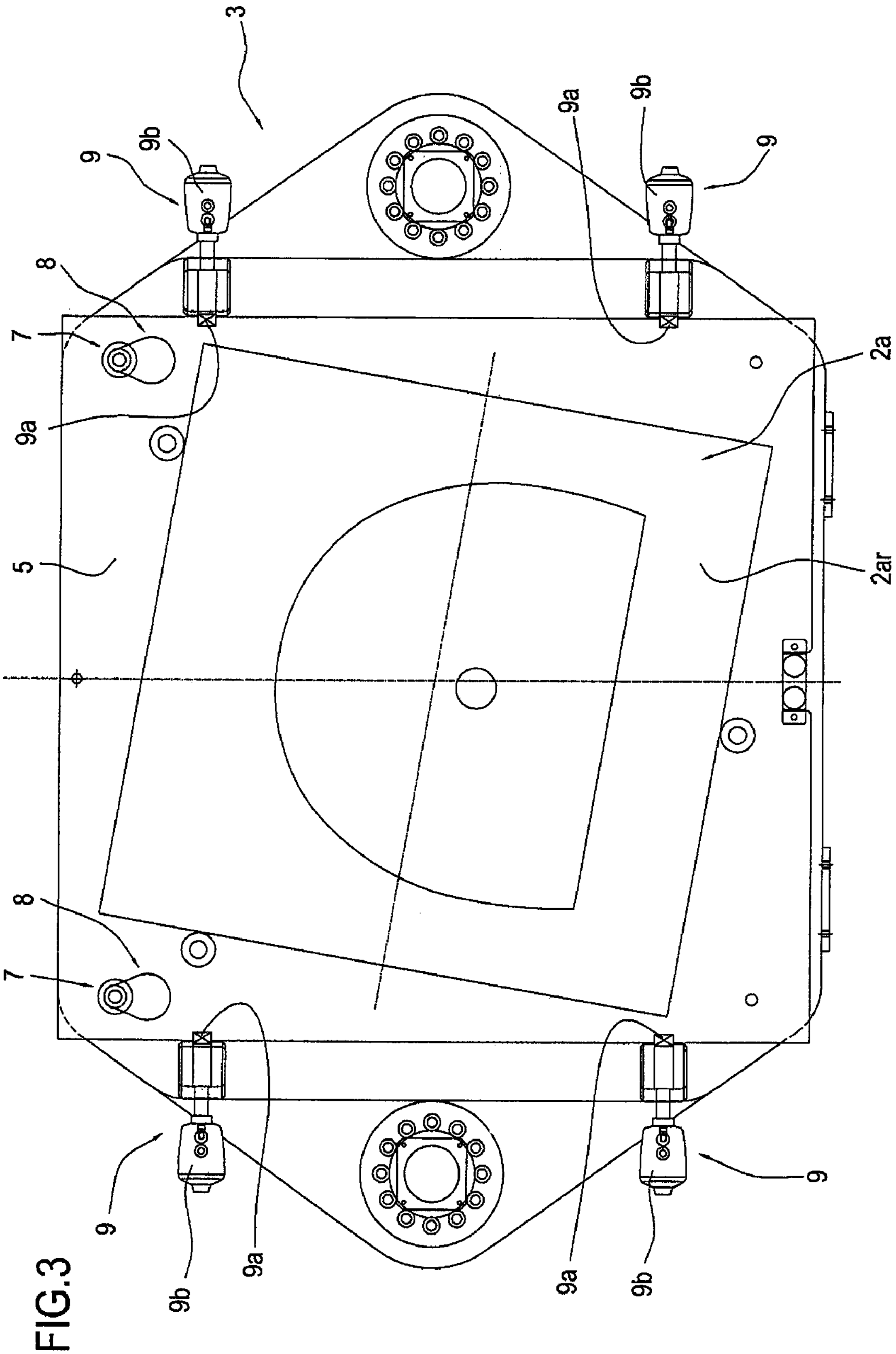
FIG. 3 is a front view with some parts cut away of a part of the machine of FIG. 2, that is, a fixed platen with a half-mould mounted on it.
Figure 9:
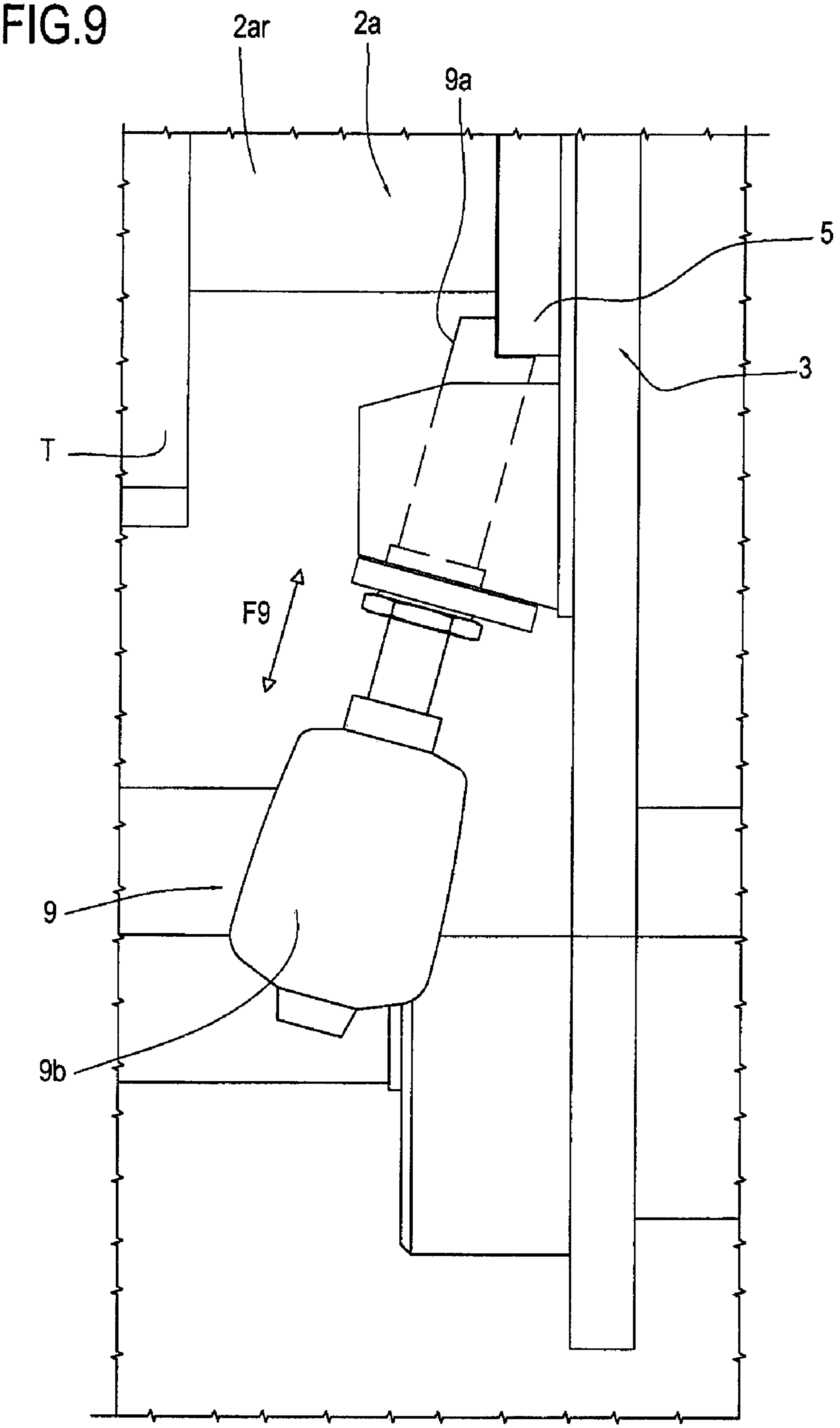
FIG. 9 is a plan view from above illustrating one of the first clamping means, with reference to FIG. 5.

As shown in FIGS. 3 and 9, the first clamping means 9 may comprise a plurality of abutment wedges **9*a* associated with the platen 3 and positioned around the perimeter of the plate 5**.

Figure 5:
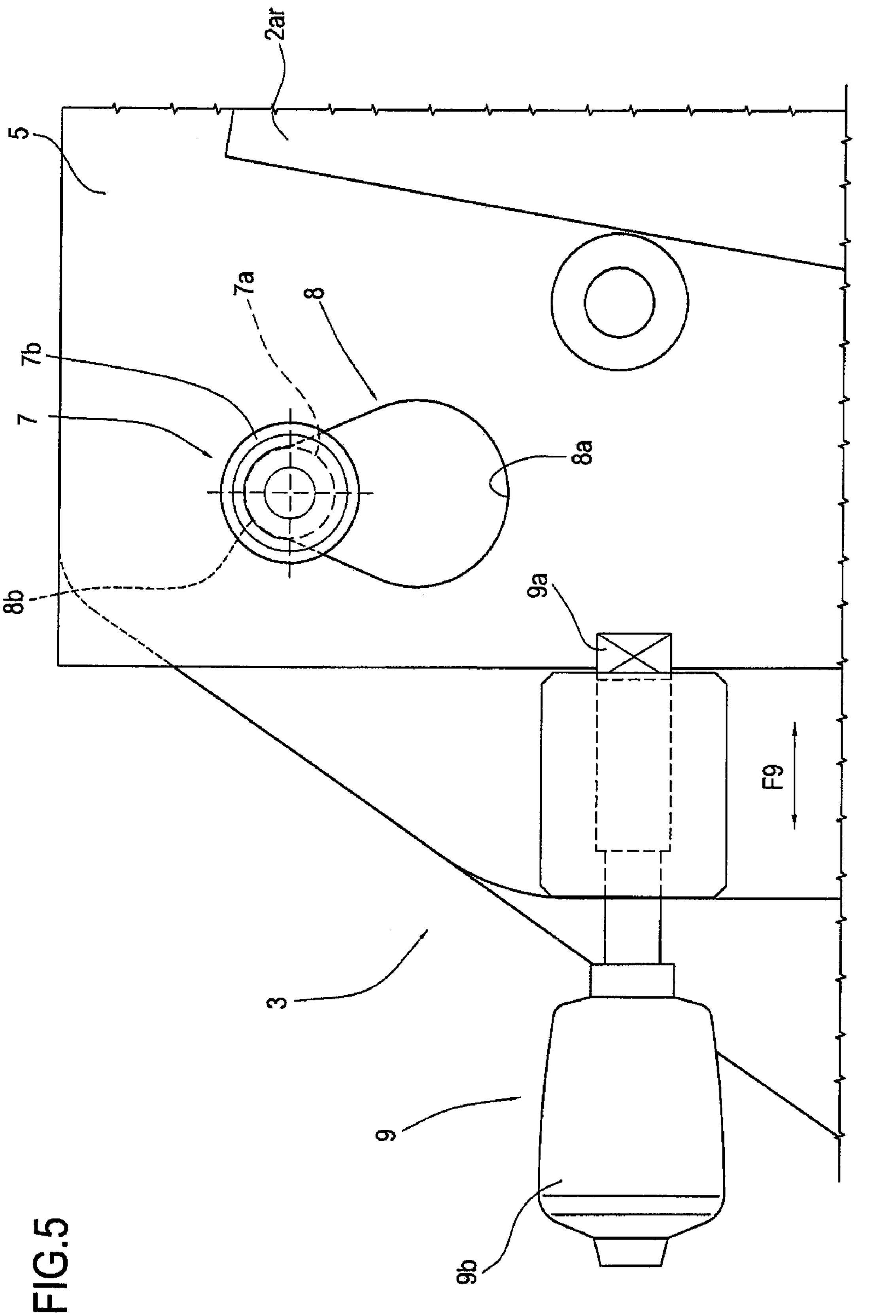
FIG. 5 is a scaled-up detail from FIG. 3, in a partial front view and showing the quick-connect means located on the half-mould and on the platen.

Each wedge **9*a* is operated upon by first means 9*b* for synchronized movement of the wedges 9*a* between a non-operating position, away from the first plate 5, and an operating position where each wedge 9*a* abuts the first plate 5 (see also arrow F9, FIGS. 5 and 9**).

As regards the second half-mould **2*b*, that is to say, the active portion 2*br*, the second plate 6 and the respective platen 4 (the mobile platen), the latter are provided with and operated on by adjustable fastening means 10 designed to adjust the relative position between the second plate 6 and the platen 4 (again, see FIGS. 1 to 4**).

In other words, since the second half-mould **2*b* is usually integral with the first half-mould 2*a* during its quick connection to the first platen 3, the second platen 4 is moved closer to the second half-mould 2*b* (as described in more detail below) in such a way that the second plate 6 is fastened by the adjustable means 10 to the platen 4, thus setting and fixing the platen—plate position: this make it possible to adjust the positioning of the joined moulds, combined with the correct position of the second plate 6 on the second platen 4, and this position will be fixed on the second plate 6** even after removal from the machine.

The second platen 4 also comprises second clamping means 11 positioned and acting between the platen 4 and the second plate 6 in order to stabilize the correlated position between the second plate 6 and the platen 4.

Figure 4:
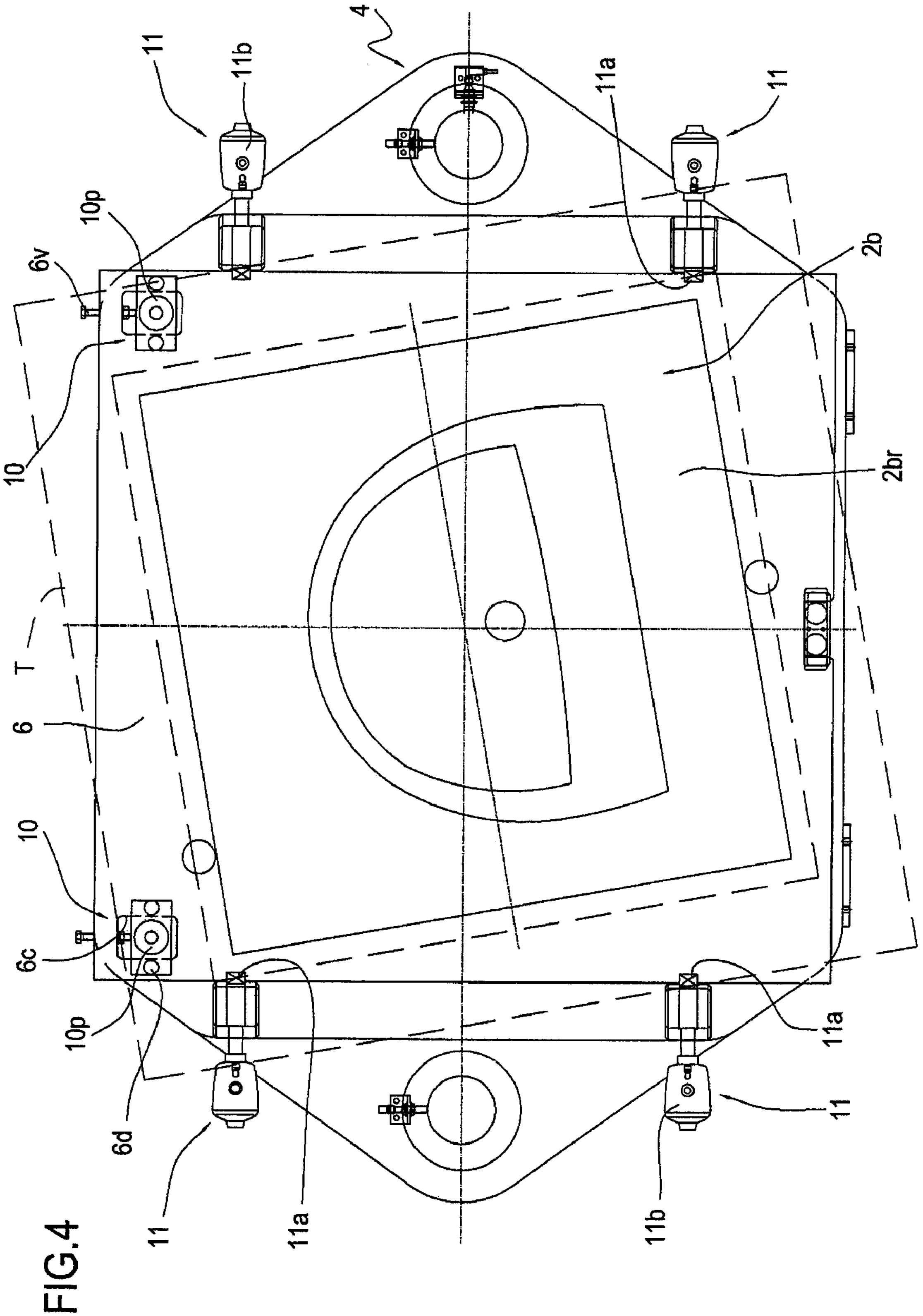
FIG. 4 is a front view with some parts cut away of a part of the machine of FIG. 2, that is, a mobile platen with the other half-mould mounted on it.
Figure 7:
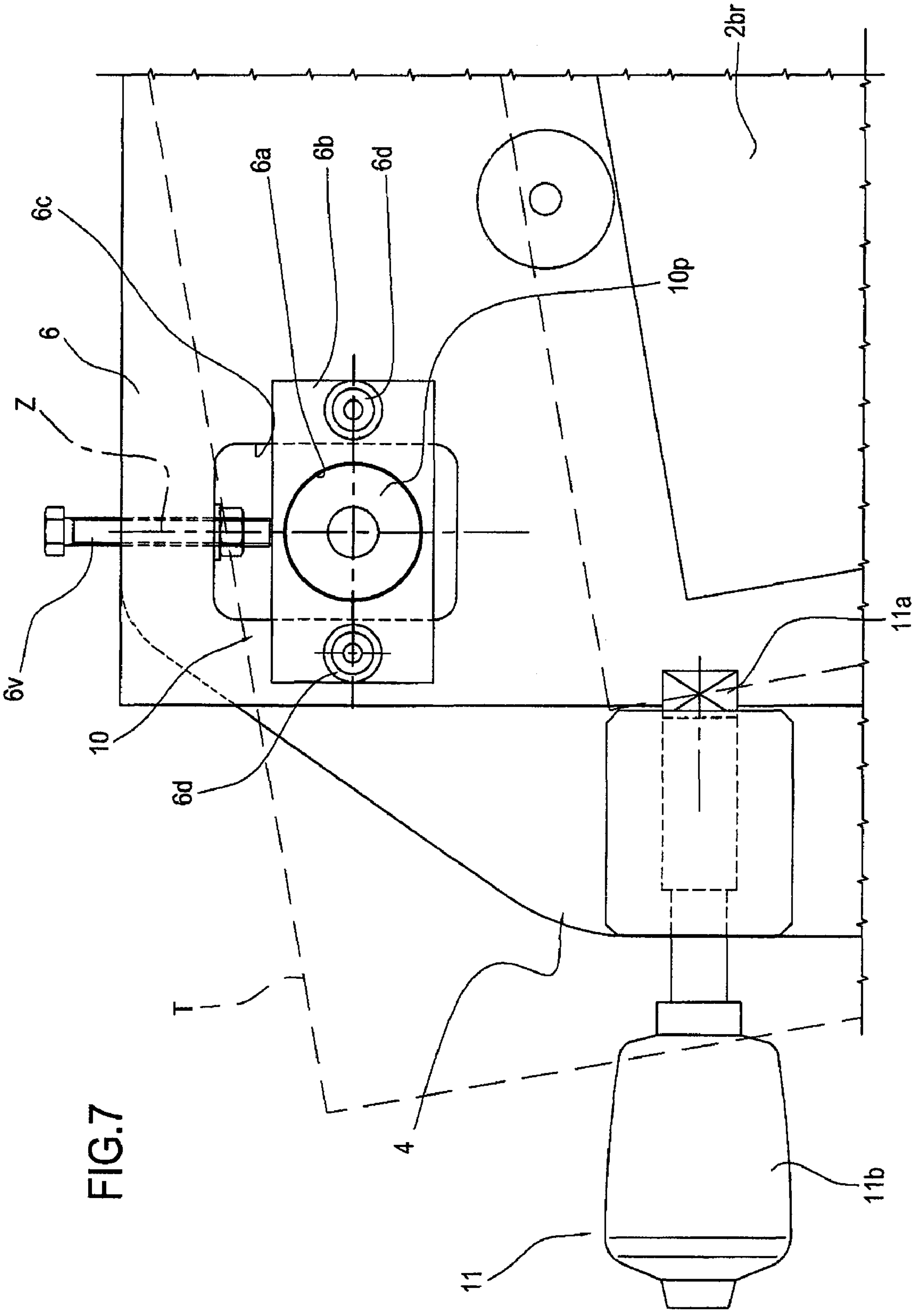
FIG. 7 is a scaled-up detail from FIG. 4, in a partial front view and showing the adjustable fastening means located on a second half-mould and on a second platen.
Figure 8:
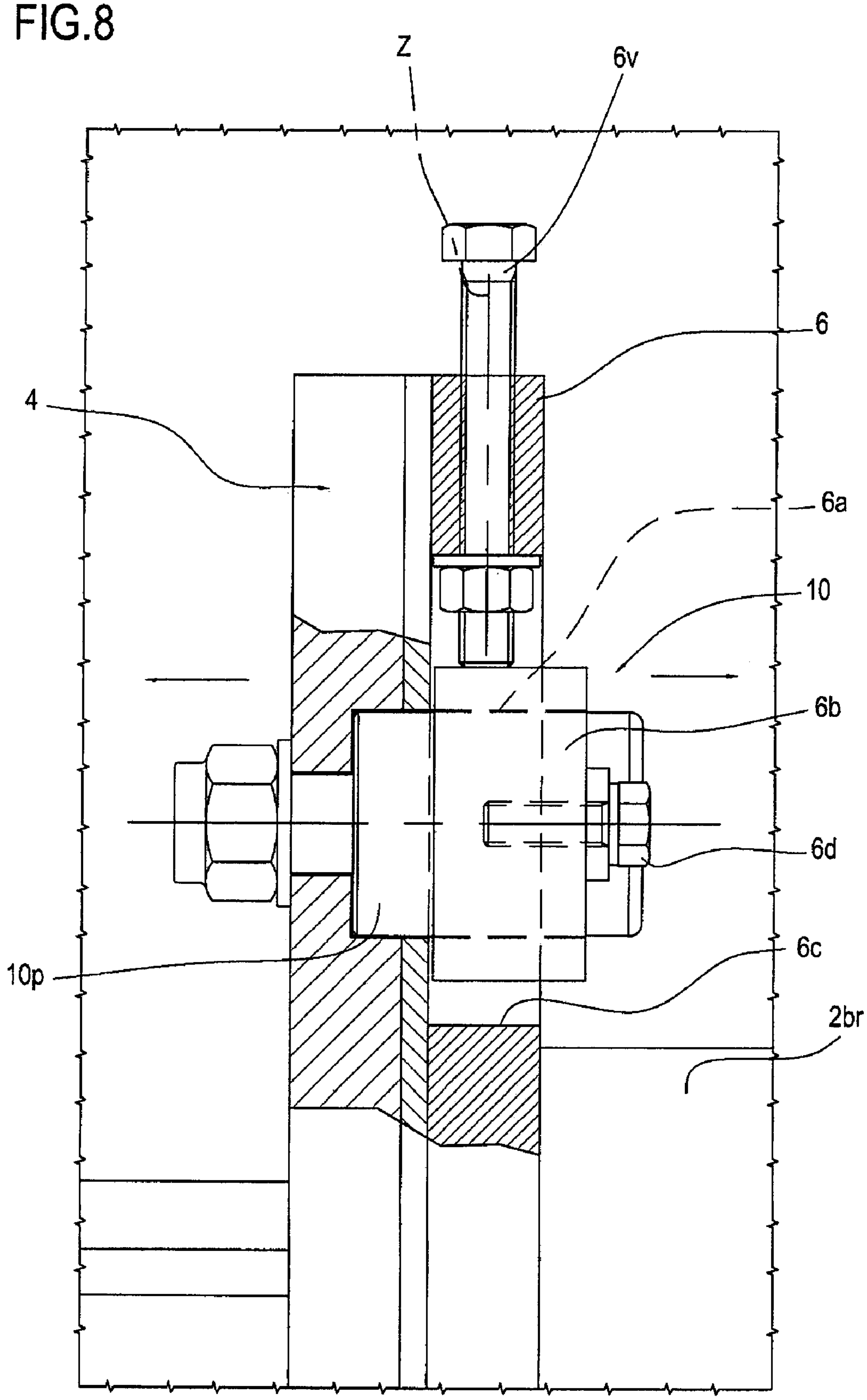
FIG. 8 is a side view of the adjustable fastening means of FIG. 7.

As shown in FIGS. 4, 7 and 8, the adjustable fastening means 10 are positioned above the center of gravity of the second half-mould **2*b* and may comprise at least one pair of studs 10*p* protruding transversally from the surface of the second platen 4**.

When the second platen 4 is moved close to the second plate 6, each of the studs **10*p* is inserted frontally into a respective through hole 6*a* made in a reference element or strip 6*b* on the plate 6**.

The strip **6*b* is associated with the second plate 6 and is adjustable in a through slot 6*c* made in the second plate 6**.

The position of each strip **6*b* is permanently fixed thanks to a pair of screws 6*d* coupled in "slotted" holes located on the second plate 6, that is to say, holes larger in diameter than the screws 6*d*** (the coupling tolerances are just a few millimeters and therefore there are no significant displacements).

Further, each strip 6*b* is acted upon, along an axis Z perpendicular to the strip 6*b* itself, by a screw 6*v* for stabilizing the position fixed and adopted by means of the screws 6*d*.

The second clamping means 11, like the first clamping means 9, may comprise a plurality of abutment wedges 11*a* associated with the second platen 4 and positioned around the perimeter of the second plate 6.

Each wedge 11*a* is operated upon by second means 11*b* for synchronized movement of the wedges 11*a* between a non-operating position, away from the second plate 6, and an operating position where each wedge 11*a* abuts the second plate 6.

Figure 10:
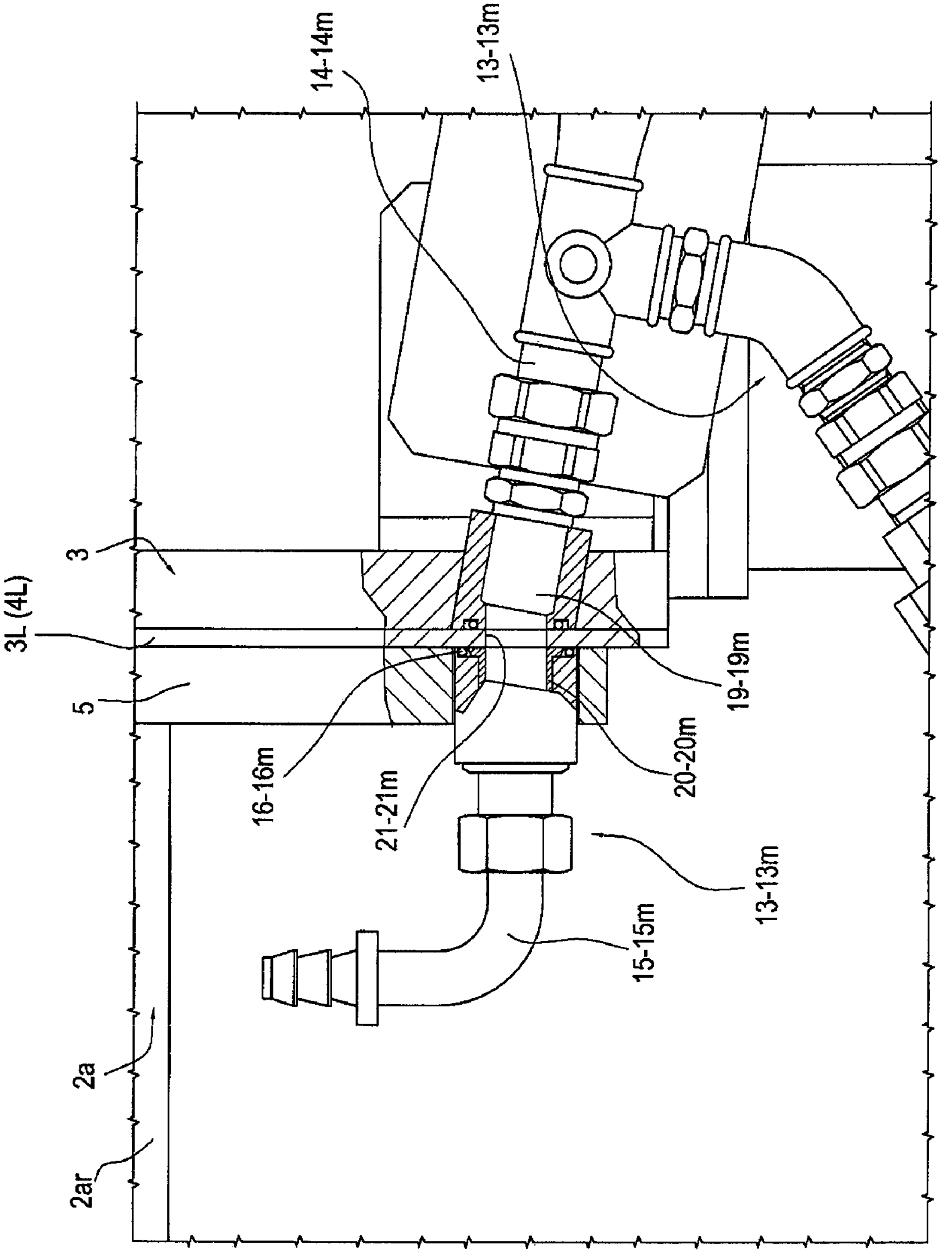
FIG. 10 is a side view, with some parts cut away in order to better illustrate others, of a detail from FIG. 1, illustrating the quick-connect means located between the first platen and a first service plate.

Other technical details of the machine might be, on the two platens 3 and 4 and on the two plates 5 and 6, respective units or circuits 13 and 13*m* for supplying/discharging the service fluids for the two half-moulds 2*a* and 2*b* and/or for the ceramic product made (see FIGS. 1 and 2 and 10).

The units 13 and 13*m* (manifolds, for example) are composed of a part 14, 14*m* located at the back of the respective platen 3 and 4 and a part 15, 15*m* at the front of the respective plate 5 and 6.

The units 13 and 13*m* allow feeding and/or discharging of mould fluids (water drainage, air, vacuum and pressure release to the atmosphere) and for making the sanitaryware (feed and discharge of slip and emptying air).

For this type of unit, first means 16 for quick connection between one part 15 of the circuit and the other part 14 of the circuit when the first half-mould 2*a* reaches the predetermined position, and second quick-connect means 16*m* for the part 15*m* of the circuit and the other part 14*m* of the circuit when the second plate 6 and the second platen 4 come into contact.

These first and second quick-connect means (FIG. 10 showing the ones on the fixed platen 3) comprise sealing means 16, 16*m* located at the end of a conduit 20, 20*m* in the part 15, 15*m* of the circuit and in the first and second plate 5 and 6 and connectable to another conduit 19, 19*m* in the part 14, 14*m* of the circuit on the first and the second platen 3 and 4.

The sealing means 16, 16*m* can be stably positioned on the side of an interconnection opening 21, 21*m* formed on the respective platen 3 and 4 (and also on a stiffening panel 3L, 4L forming an integral part of the platen 3, 4), and which, when the first and second plates 5 and 6 are positioned stably against the respective platens 3 and 4, form a sealed union between the two conduits 19, 19*m* and 20, 20*m* (thanks to compression of the sealing means).

The mould 2 can be mounted on a machine 1 made in this way in the following steps:

- attaching the active filtering portion 2*ar* of the first half-mould 2*a* to the service plate 5 to form a first portion of the mould 2, the plate 5 being provided with a first part of the quick-connect means 7, 8;
- associating the plate 5 to the first platen 3, provided with another part of the quick-connect means 7 and 8 through quick connection in a predetermined hanging position.

Obviously, there may be a step of attaching the second service plate 6 to the respective active filtering portion 2*br* of the second half-mould 2*b*, to form the second portion of the mould 2 before the quick-connect associating step.

The associating step may be performed by: lifting the half-mould 2*a* and the plate 5 or the entire mould 2 to the required height (using suitable machinery such as a forklift truck or a crane, not illustrated); positioning the two bottom lobes 8*a* of the slots 8 facing the studs 7 and coupling them with the latter (see arrow F8, FIG. 2) and then lowering the mould 2 until the upper lobes 8*b* come into contact with the stems 7*a* (see arrow F8*b*).

At this point, the mould 2 is released so that the platen 3 and the plate 5 come into contact at a predetermined position (see arrow F8*c*) under the action of gravity which causes the plate 5 to abut the platen 3.

The step of associating the plate 5 with the first platen 3 is followed by a step of clamping and automatically stabilizing the plate 5 on the platen 3 by the means 9, this constituting the step of stabilizing the predetermined position.

The associating step is substantially simultaneous with a step of quick connection, through the first connecting means 16, of the circuit part 14 to the other circuit part 15 on the first plate 5.

Once the position of the first half-mould 2*a* has been defined, there may be a step of moving the second platen 4 closer to and into contact with the second plate 6 in such a way as to fix the relative position between the second platen 4 and the second plate 6 through the adjustable fastening means 10 acting between them.

After fixing the relative position between the platen 4 and the plate 6, the step of clamping the second plate 6 to the second platen 4 through the clamping means 11 may be started.

Contact between the platen 4 and the plate 6 triggers the step of quick connection, through the second connecting means 16*m*, of the circuit part 14*m* to the other circuit part 15*m* on the second plate 6.

A mould mounting device made in this way thus achieves the aforementioned aims thanks to an extremely simple yet effective quick-connect system capable above all of using the service plate (forming an integral part of each half-mould) as a precise mechanical positioning element providing sure and precise mutual distances and dimensions of the platen-plate pair.

Thanks to these fixed points and to the special structure of the stud and slot combination, the half-mould or the entire mould can be mounted very quickly and precisely in exactly the same position each time.

The fastening means on the other half-mould make it possible to further reduce the time required by fixing the relative position between the other plate and the other platen, thus reducing machine down times (especially when the same mould has to be mounted after each casting cycle).

Thanks to these predetermined positions, the clamping means can also be automated in such a way as to further reduce down time necessary for mounting the mould.

The same applies to the quick connection of the service circuits for mould and product.

In short, therefore, the device according to the invention enables a mould to be changed and mounted with extreme precision in much less time than traditional solutions.

The invention described above is susceptible of industrial application and may be modified and adapted in several ways without thereby departing from the scope of the inventive concept. Moreover, all the details of the invention may be substituted by technically equivalent elements.

What is claimed is:

1. A device for mounting a mould in a machine (1) that comprises at least:

- a mould (2) composed of at least two half-moulds (2*a*, 2*b*) that can be joined to each other to form an internal cavity where an article of sanitaryware can be formed; at least one first half-mould (2*a*) comprising an active filtering portion (2*ar*) made of porous resin and a passive rigid first service plate (5), the service plate (5) and the active filtering portion (2*ar*) being rigidly connected together, the first half-mould (2*a*) having a center of gravity when mounted in the machine;

a mounting unit or platen (3, 4) for each of the half-moulds (2*a*, 2*b*), placed opposite each other and movable substantially horizontally towards and away from each other along a clamping line (S);

the service plate (5) being rigidly connected, in use, between the active filtering portion (2*ar*) and the respective platen (3), the mould mounting device comprising at least:

reference and quick connect means (7, 8); said reference and quick connect means (7, 8) comprising a first part and a second part, wherein the service plate (5) is provided with the first part and the platen (3) is provided with the second part so that the service plate (5) can be hung from the platen (3) and located in a predetermined position so that the first half-mould (2*a*) can be further secured prior to use, the first part being provided on the plate (5) in a region above the center of gravity of the first half-mould (2*a*).

2. The device according to claim 1, further comprising first clamping means (9) positioned and acting at least between the platen (3) and the service plate (5) and effective to stabilize the service plate (5) in said predetermined position.

3. The device according to claim 1, wherein the reference and quick connect means (7, 8) are located at least in a region of the plate (5) and the platen (3) relative to the center of gravity of the first half-mould (2*a*), in order to enable the first half-mould (2*a*) to be moved into place by gravity, thereby stabilizing the first half-mould (2*a*) in a predetermined position.

4. The device according to claim 1, wherein the platen (3) which is provided with part of the reference and quick connect means (7, 8) is fixed relative to the other platen (4), the latter being slidable in both directions along the clamping line (S).

5. The device according to claim 1, wherein the first half-mould (2*a*), provided with part of the reference and quick connect means (7, 8), is coupled to the other half-mould (2*b*) upon fastening to the platen (3).

6. The device according to claim 5, wherein the first half-mould (2*a*), provided with part of the reference and quick connect means (7, 8), is fastened to the platen (3) that is fixed relative to another platen (4) which is movable towards and away from the fixed platen (3).

7. The device according to claim 1, where the second half-mould (2*b*) comprises an active filtering portion (2*br*) made of porous resin and a passive rigid second service plate (6), the second service plate (6) and the active filtering portion (2*br*) being rigidly connected together; the second service plate (6) being rigidly connected, in use, between the active filtering portion (2*br*) and the respective platen (4), the device further comprising means (10) for adjustably fastening the second half-mould (2*b*) located and acting between the second service plate (6) and the platen (4) and being designed to adjust the relative position between the second service plate (6) and the platen (4).

8. The device according to claim 7, further comprising second clamping means (11) positioned and acting between the platen (4) and the second service plate (6) and designed to stabilize the correlated position between the second service plate (6) and the platen (4).

9. The device according to claim 1, wherein the reference and quick connect means comprise:

at least one pair of studs (7) located at least on the platen (3); each of the studs (7) having a stem (7*a*) and a large free end (7*b*);

a pair of slots (8) made in the first service plate (5); each slot (8) having the shape of a two-lobed drop where the bottom lobe (8*a*) has an opening larger than the diameter (D) of the large end (7*b*) of the stud (7), allowing the latter to pass through it freely, and where the upper lobe (8*b*) has an opening that is smaller than the diameter (D) of the large end (7*b*).

10. The device according to claim 9, wherein the upper lobe (8*b*) of each slot (8) has a semicircular upper profile that is substantially the same as the semicircular upper surface of the stem (7*a*) so as to support the first service plate (5) stably in the predetermined position.

11. The device according to claim 9, wherein a length (L) of the stem (7*a*) of each stud (7) is at least equal to the thickness (Sp) of the first service plate (5).

12. The device according to claim 9, wherein a length (L) of the stem (7*a*) of each stud (7) is greater than the thickness (Sp) of the first service plate (5).

13. The device according to claim 9, wherein the large end (7*b*) of each stud (7), forming an undercut, has an inclined transition surface (7*s*) to the stem (7*a*), forming a slideway along which the first plate (5) is made to slide towards the stem (7*a*) until resting stably on the upper lobe (8*b*).

14. The device according to claim 2, wherein the first clamping means (9) comprise at least one abutment wedge (9*a*) associated with the platen (3) and movable by respective first movement means (9*b*) between a non-operating position, away from the first service plate (5), and an operating position where the wedge (9*a*) abuts the first service plate (5).

15. The device according to claim 2, wherein the first clamping means (9) comprise a plurality of abutment wedges (9*a*) associated with the platen (3) and positioned around the perimeter of the first service plate (5); each wedge (9*a*) being operated upon by first means (9*b*) for synchronized movement of the wedges (9*a*) between a non-operating position, away from the first service plate (5), and an operating position where each wedge (9*a*) abuts the first service plate (5).

16. The device according to claim 7, wherein the adjustable fastening means (10) are positioned above the center of gravity of the second half-mould (2*b*).

17. The device according to claim 7, wherein the adjustable fastening means (10) of the second half-mould (2*b*) comprise at least one pair of studs (10*p*) protruding transversally from the surface of the second platen (4) and each of which, when the second platen (4) is moved close to the second plate (6), is inserted frontally into a respective through hole (6*a*) made in a reference element or strip (6*b*) on the second plate (6); the strip (6*b*) being associated with the second plate (6) and being adjustable in a through slot (6*c*) made in the second plate (6); means (6*d*) being provided for fixing the position adopted by the reference element or strip (6*b*) being and being active between the strip (6*b*) itself and the second plate (6).

18. The device according to claim 8, wherein the second clamping means (11) comprise at least one abutment wedge (11*a*) associated with the second platen (4) and movable by respective first movement means (11*b*) between a non-operating position, away from the second plate (6), and an operating position where the wedge (11*a*) abuts the second plate (6).

19. The device according to claim 8, wherein the second clamping means (11) comprise a plurality of abutment wedges (11*a*) associated with the second platen (4) and positioned around the perimeter of the second plate (6); each wedge (11*a*) being operated upon by second means (11*b*) for synchronized movement of the wedges (11*a*) between a non-operating position, away from the second plate (6), and an operating position where each wedge (11*a*) abuts the second plate (6).

20. The device according to claim 1, where at least the platen (3) is provided with at least one unit or circuit (13) for supplying/discharging service fluids for the first half-mould (2*a*) and/or for a ceramic product made, said circuit (13) comprising a part (14) located on the platen (3) and a part (15) on the service plate (5), the device further comprising first quick-connect means (16) between the part (14) of the circuit (13) on the platen (3) and the part (15) of the circuit (13) on the first service plate (5) when the first half-mould (2*a*) reaches a predetermined position.

21. The device according to claim 7, where the second platen (4) is provided with at least one unit or circuit (13*m*) for supplying/discharging service fluids for the second half-mould (2*b*) and/or for a ceramic product made, said circuit (13*m*) comprising a part (14*m*) located on the platen (4) and a part (15*m*) on the second plate (6), the device further comprising second quick-connect means (16*m*) between the part (14*m*) of the circuit (13*m*) on the platen (4) and the part (15*m*) of the circuit (13*m*) on the second plate (6).

22. The device according to claim 20, where the second half-mould (2*b*) comprises an active filtering portion (2*br*) made of porous resin and a passive rigid second service plate (6), the second service plate (6) and the active filtering portion (2*br*) being rigidly connected together; the second service plate (6) being rigidly connected, in use, between the active filtering portion (2*br*) and the respective platen (4), the device further comprising means (10) for adjustably fastening the second half-mould (2*b*) located and acting between the second service plate (6) and the platen (4) and being designed to adjust the relative position between the second service plate (6) and the platen (4), and where the second platen (4) is provided with at least one unit or circuit (13*m*) for supplying/discharging the service fluids for the second half-mould (2*b*) and/or for the ceramic product made, said circuit (13*m*) comprising a part (14*m*) located on the platen (4) and a part (15*m*) on the second service plate (6), the device further comprising second quick-connect means (16*m*) between the part (14*m*) of the circuit (13*m*) on the platen (4) and the part (15*m*) of the circuit (13*m*) on the second service plate (6), wherein the first and second quick-connect means comprise sealing means (16, 16*m*) located at the end of a conduit (20, 20*m*) in the part (15, 15*m*) of the circuit in the first and second plates (5, 6) and connectable to another conduit (19, 19*m*) in the other part (14, 14*m*) of the circuit; the sealing means (16, 16*m*) being stably positionable on the side of an interconnection opening (21) formed on the respective platen (3, 4), and which, when the first plate (5) and the second plate (6) are positioned stably against the respective platen (3, 4), form a sealed union between the two conduits (19, 19*m*, 20, 20*m*).

* * * * *